(12) United States Patent
Yazawa et al.

(10) Patent No.: US 6,765,051 B2
(45) Date of Patent: Jul. 20, 2004

(54) PHENOL RESIN FORMING MATERIAL FOR PULLEY USED IN MOTOR VEHICLES AND PHENOL RESIN PULLEY FOR MOTOR VEHICLES

(75) Inventors: Hidemi Yazawa, Tokyo (JP); Etsuji Oono, Tokyo (JP); Hideki Oka, Kariya (JP); Hiroyuki Wakabayashi, Kariya (JP); Kazuo Kato, Kariya (JP)

(73) Assignees: Sumitomo Bakelite Company Limited, Tokyo (JP); DENSO Corporation, Kariya (JP)

( * ) Notice: Subject to any disclaimer, the term of this patent is extended or adjusted under 35 U.S.C. 154(b) by 0 days.

(21) Appl. No.: 10/365,479

(22) Filed: Feb. 13, 2003

(65) Prior Publication Data

US 2003/0134962 A1 Jul. 17, 2003

Related U.S. Application Data

(62) Division of application No. 09/986,278, filed on Nov. 8, 2001, now Pat. No. 6,559,218.

(30) Foreign Application Priority Data

Nov. 13, 2000 (JP) .......................... 2000-344718

(51) Int. Cl.[7] .............. C08J 5/10; C08K 3/40; C08L 61/10

(52) U.S. Cl. ............. 524/494; 524/425; 524/445; 524/442

(58) Field of Search .................. 524/425, 445, 524/492, 493, 494, 442

(56) References Cited

U.S. PATENT DOCUMENTS

4,460,730 A    7/1984  Koyama et al.

FOREIGN PATENT DOCUMENTS

| JP | 8-145148 | 6/1996 |
| JP | 9-217818 | 8/1997 |

*Primary Examiner*—James J. Seidleck
*Assistant Examiner*—U. K. Rajguru
(74) *Attorney, Agent, or Firm*—Oblon, Spivak, McClelland, Maier & Neustadt, P.C.

(57) ABSTRACT

A phenol resin composition for forming pulleys used in motor vehicles is disclosed. The composition comprises 35 to 45 wt % of resol, 35 to 45 wt % of glass fiber, 5 to 15 wt % of one or more inorganic powders selected from the group consisting of calcium carbonate, clay, and wallastonite, and 1 to 3 wt % of polyvinyl butyral. The phenol resin pulley for motor vehicles is almost free from swelling or shell cracking on the surface at a high temperature of 250° C. or more and exhibits high mechanical strength and superior thermal shock resistance.

18 Claims, 1 Drawing Sheet

PHENOL RESIN FORMING MATERIAL FOR PULLEY USED IN MOTOR VEHICLES AND PHENOL RESIN PULLEY FOR MOTOR VEHICLES

This application is a Division of application Ser. No. 09/986,278 Filed on Nov. 8, 2001, now U.S. Pat. No. 6,559,218.

TECHNICAL FIELD

The present invention relates to a phenol resin composition for forming pulleys used in motor vehicles, being capable of forming a resin pulley which is free from swelling or shell cracking on the surface at a high temperature of 250° C. or more and exhibits high mechanical strength and superior thermal shock resistance, and to a phenol resin pulley for motor vehicles formed from the resin.

BACKGROUND ART

A phenol resin pulley is light and noiseless as compared with metal pulleys and, as compared with resin pulleys made from thermoplastic resins such as nylon and polyphenyl sulfide, the phenol resin pulley excels in dimensional accuracy and is free from melting or deformation when the pulley is overheated in emergencies or the like. Therefore, the phenol resin pulley is suitably used for motor vehicles requiring lightness, quietness, high reliability, and the like. Conventionally, phenol resin pulleys using organic fiber such as cellulose as a main substrate have been widely used to satisfy the light weight and belt strength properties required for such pulleys.

A phenol resin pulley using organic fiber as a main substrate, however, sometimes swells or cracks on the surface due to decomposition of the organic fiber when the pulley is instantaneously overheated at 250° C. or above due to belt slip. This may cause chips in the V-groove portion of the pulley and accelerate deterioration of the belt.

As a phenol resin pulley which suppresses such swelling and shell cracking, the phenol resin pulley using aramid fiber having thermal resistance higher than cellulose as organic fiber has been known. However, the aramid fiber is not only extremely expensive, but also is very difficult to disperse in phenol resins and the like, giving rise to poor productivity when producing a resin composition by kneading with phenol resins and the like. In addition, the resulting resin composition exhibits only poor formability. For these reasons, the aramid fiber is difficult to employ as a general-purpose material.

One phenol resin forming material for pulleys employs a phenol aralkyl resin as a phenol resin component. A phenol aralkyl resin is a novolak-type resin using hexamethylenetetramine as a curing agent. Therefore, unreacted hexamethylenetetramine may remain in phenol resin pulleys. Because hexamethylenetetramine vaporizes at a temperature of 200° C. or below, the surface of a pulley may swell if the temperature increases above 250° C. as mentioned above.

In addition to the non-swelling and shell crack-free properties, a phenol resin pulley must have high mechanical strength. As a phenol resin pulley exhibiting improved mechanical strength, a phenol resin pulley with glass fiber incorporated therein has conventionally been known. In spite of the improvement in mechanical strength and a decrease in the coefficient of linear expansion, this pulley exhibits an increased modulus of elasticity and decreased tensile elongation, rendering the pulley easily broken by thermal shock.

Japanese Patent Application Laid-open No. 217818/1997 discloses a phenol resin pulley formed from a resin composition containing a phenol resin, inorganic fiber, inorganic powder, organic fiber, and elastomer. This pulley play is claimed to exhibit excellent wear resistance and the heat shock resistance.

However, this pulley begins to decompose at a temperature lower than 250° C. because the pulley contains organic materials such as organic fiber and elastomer, in addition to glass fiber which is an inorganic material. For this reason, the pulley swells, produces shell cracks, or exhibits a decrease in the mechanical strength under conditions of 250° C. or higher.

An object of the present invention, therefore, is to provide a phenol resin forming material for a pulley used in motor vehicles which is free from swelling or shell cracking on the surface at a high temperature of 250° C. or more and exhibits high mechanical strength and superior thermal shock resistance.

DISCLOSURE OF THE INVENTION

In view of the above-described situation, the inventor of the present invention has conducted extensive studies and, as a result, has found that a phenol resin composition comprising resol, glass fiber, specific inorganic powder, and polyvinyl butyral in a specific ratio can form a pulley for motor vehicles which is almost free from swelling or shell cracking on the surface at a high temperature of 250° C. or more and exhibits high mechanical strength and superior thermal shock resistance. This finding has led to the completion of the present invention.

Specifically, the present invention is to provide a phenol resin composition for forming pulleys used in motor vehicles, comprising 35 to 45 wt % of resol, 35 to 45 wt % of glass fiber, 5 to 15 wt % of one or more inorganic powders selected from the group consisting of calcium carbonate, clay, and wallastonite, and 1 to 3 wt % of polyvinyl butyral.

The present invention also provides a pulley for motor vehicles formed from the phenol resin composition.

DETAILED DESCRIPTION

Figure 1:
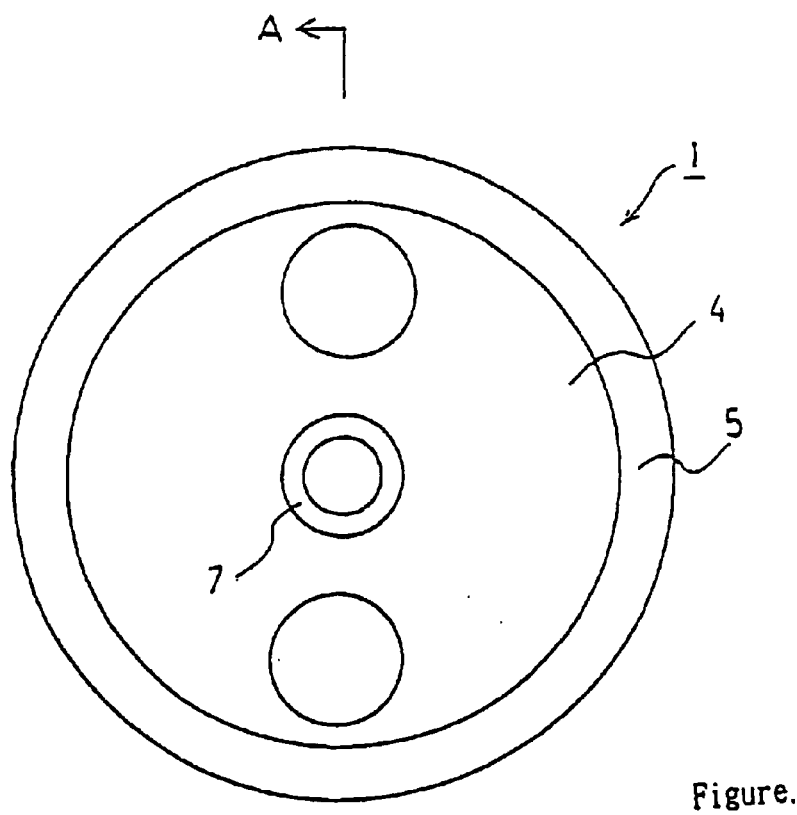
FIG. 1 is a front view of the phenol resin pulley for motor vehicles of the present invention and FIG. 2 is a cross section along the line A—A of the FIG. 1.

Resol is used as a phenol resin component in the phenol resin composition for forming pulleys used in motor vehicles of the present invention. The resol differs from a novolak in the self-curable properties, i.e. the resol can be cured without the addition of a curing agent such as hexamethylenetetramine and the like as required by the novolak. Therefore, the resulting phenol resin pulley does not contain any unreacted curing agent remaining therein and, therefore, is free from swelling due to vaporization of the curing agent. Either one type of resol may be used independently or two or more resoles may be used in combination.

The resols are contained in the amount of 35 to 45 wt % in the phenol resin composition. If the amount of resol is less than 35 wt %, the resulting phenol resin pulley has an extremely high modulus of elasticity and an unduly decreased tensile elongation. As a result, the thermal shock resistance of the phenol resin pulley is remarkably impaired. The thermal shock resistance in this invention is determined, for example, by the thermal shock test, wherein one cycle consists of leaving the sample at −40° C. for 30 minutes, then at 120° C. for 30 minutes. This cycle is repeated until a crack is produced in the sample. The larger the number of cycles, the greater the thermal shock resistance. If the amount of resol is more than 45 wt %, not only the thermal shock resistance is decreased due to a decrease in the mechanical strength and an increase in the coefficient of linear expansion, but also the dimensional change of the phenol resin pulley due to molding shrinkage and post-molding shrinkage increases. If the dimensional change of the phenol resin pulley is too large, the prescribed size of the formed product cannot be maintained. This may cause the pulley to excessively vibrate or impose an abnormal load on the belt during driving, giving rise to breaking of the phenol resin pulley or the belt.

In the present invention, glass fiber and inorganic powder are used as substrate materials to be blended with resol. Because glass fibers and inorganic powders have a decomposition temperature of above 600° C., these materials do not cause swelling or produce shell-cracks in the phenol resin pulley, even if the pulley is instantaneously overheated above 250° C. due to belt slip. Because glass fibers and inorganic powders exhibit smaller shrinkage and expansion by heating than organic materials, the resulting phenol resin pulley may have a smaller coefficient of linear expansion. As a result, the heat shock resistance of the phenol resin pulley can be improved.

Glass fibers used in the present invention include, but are not limited to, C glass fiber, A glass fiber, E glass fiber, S glass fiber, ARG fiber, and ECR fiber. The average diameter of glass fibers is usually 1 to 50 $\mu$m. The average length of glass fibers is usually 1 $\mu$m to 10 mm, preferably 10 $\mu$m to 10 mm. In the present invention, either one type of the above glass fibers may be used individually or two or more types may be used in combination.

Glass fibers are used in the present invention to improve the mechanical strength of the phenol resin pulley. For these reasons, the glass fiber content of the phenol resin composition is 35 to 45 wt %, and preferably 40 to 45 wt %. If the glass fiber content is less than 35 wt %, sufficient mechanical strength cannot be ensured. If the glass fiber content is more than 45 wt %, the modulus of elasticity becomes too large to maintain adequate heat shock resistance, even though the mechanical strength is improved.

As examples of inorganic powders used in the present invention, calcium carbonate, clay, wallastonite, and the like can be given. These inorganic powders are well dispersed in phenol resins, can produce a resin composition with excellent productivity and are well formed into pulleys, significantly improve heat resistance and mechanical strength, and decrease wear of the pulleys. Sintered clay produced by sintering to remove crystal water is free from swelling or shell cracking, because no crystal water is generated from such a clay when overheated by belt slip or the like of the phenol resin pulley.

The average diameter of the inorganic powder is usually 0.1 to 100 $\mu$m. The average particle diameter in the above range is preferable to finely disperse inorganic powders among glass fibers and increase heat resistance and mechanical strength. In the present invention, either one type of the inorganic powders may be used individually or two or more types may be used in combination.

Because the inorganic powders are finely dispersed among glass fibers, these are used in the present invention to increase heat resistance and mechanical strength of the phenol resin pulley. The inorganic powders are contained in the amount of 5 to 15 wt % in the phenol resin composition. If the content of inorganic powders is less than 5 wt %, sufficient heat resistance and mechanical strength cannot be ensured. If the content of inorganic powders is more than 15 wt %, the reinforcing effect of the glass fiber is impaired, decreasing the mechanical strength.

Polyvinyl butyral used in the present invention is a polyvinyl butyral having a butylation degree of 60 to 95 mol % and a polymerization degree of 200 to 3000. In the phenol resin pulley, the hydroxyl groups contained in part of polyvinyl butyral react with the hydroxyl groups in the branched chain of the benzene ring of the resol. The polyvinyl butyral is thus incorporated in the cross-linking structure of resol. For this reason, polyvinyl butyral more firmly bonds to resol in the phenol resin than conventional organic additives used in phenol resin pulleys, such as elastomers of vinyl acetate, NBR, chloroprene rubber, and the like which independently have an island-like structure in phenol resin. Therefore, it is very seldom for the phenol resin pulley of the present invention to deteriorate due to separation of resol and polyvinyl butyral on the interface. This gives rise to greater heat shock resistance of the phenol resin pulley of the present invention. In the present invention, either one type polyvinyl butyral may be used individually or two or more types may be used in combination.

Polyvinyl butyrals are used in the present invention to improve the heat shock resistance. The polyvinyl butyrals are contained in an amount of 1 to 3 wt % in the phenol resin composition. If the content of polyvinyl butyrals is less than 1 wt %, sufficiently high heat shock resistance cannot be ensured. If the content of polyvinyl butyrals is more than 3 wt %, the phenol resin pulley may swell at high temperatures, giving rise to a decrease in the mechanical strength.

The phenol resin forming material for pulleys used in motor vehicles of the present invention can be obtained as granules by kneading a mixture of the resols, glass fibers, inorganic powders, and polyvinyl butyrals in a ratio as described above using heating rolls, and cooling and pulverizing the kneaded product.

The phenol resin pulley for motor vehicles of the present invention can be obtained by forming the above phenol resin forming material for pulleys of motor vehicles. As a method of forming, compression molding, transfer molding, injection molding, and the like can be given.

Figure 2:
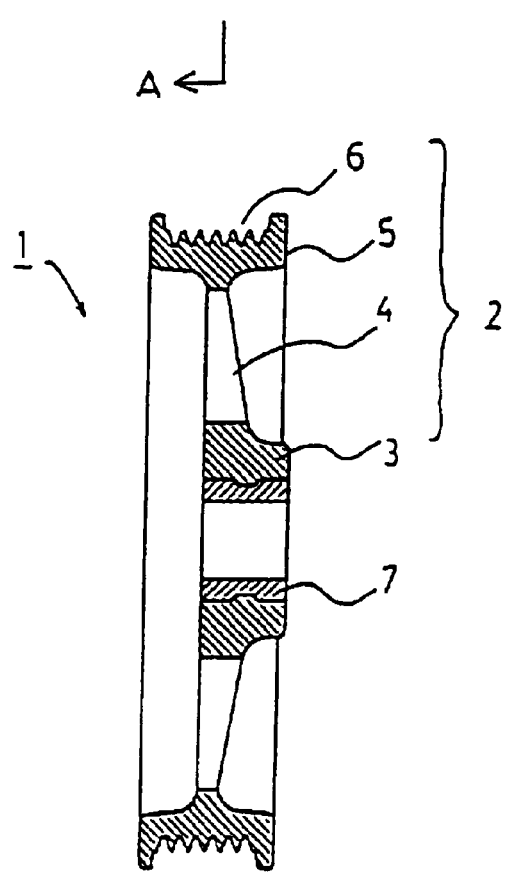

The phenol resin pulley usually has a V-shaped groove for a belt and has a main body, of which the part excluding a central boss engages with a boss formed from the phenol resin forming material. A specific example of such a phenol resin pulley has a structure shown in FIGS. 1 and 2. In FIGS. 1 and 2, the phenol resin pulley 1 has a metallic boss 7 with which the main body 2 of the pulley engages. The main body 2 is formed from an engagement part 3 engaging with the metallic boss 7, an outer casing 5 having a V-groove 6, and a rib 4 connecting the engagement part 3 and the outer casing 5. Any phenol resin pulley for motor vehicles falls within the scope of the present invention inasmuch as such a pulley has at least an outer casing 5 having a V-groove 6 made from the above-described phenol resin forming material.

EXAMPLES

The present invention will be described in more detail by examples, which should not be construed as limiting the present invention.

The following components were used in Examples and Comparative Examples.

Resol: PR-5150B (manufactured by Sumitomo Durez Co., Ltd.)
Novolak: PR-50716 (manufactured by Sumitomo Durez Co., Ltd.)
Glass fiber: E-glass fiber, average fiber diameter 10 μm, average fiber length 2 μm.
Cellulose: Average fiber diameter 15 μm, average fiber length 80 μm, maximum fiber length 150 μm.
Calcium carbonate: average particle diameter 3 μm
Clay: Sintering clay (Major component: aluminum silicate), average particle diameter 3 μm
Wallastonite: average particle diameter 10 μm
Polyvinyl butyral: S-LEC (manufactured by Sekisui Chemical Co., Ltd.)
Vinyl acetate: Sacnole (manufactured by Denki Kagaku Kogyo Co., Ltd.)
Coloring agent: carbon black
Releasing agent: stearic acid
Curing catalyst: slaked lime

Example 1

The materials were mixed in the proportion shown in Table 1. The mixture was kneaded using a heating roll, and removed in the form of a sheet which was cooled and pulverized to obtain granules of phenol resin forming material A.

This phenol resin forming material A was charged into a mold heated at 175° C. and compress-molded for 3 minutes at 300 kgf/cm² to obtain a resin formed article {(4 mm in thickness)×(10 mm in width)×(80 mm in length)}, which is a test specimen conforming to the folding test of JIS K6911.

The tensile strength, tensile modulus of elasticity, tensile elongation, coefficient of linear expansion, and heat resistance in a thermostatic oven and in a solder solution of the test specimen were determined. The results are shown in Table 2. The following methods of determination of various properties were used.

(Tensile Strength, Tensile Modulus of Elasticity, and Tensile Elongation)

The above resin formed material was evaluated according to the general test methods of heat-curable plastics of JIS K6911.

(Coefficient of Linear Expansion)

The above resin formed material was evaluated according to "the test method for coefficient of linear expansion of heat-curable plastics" of JIS K7197.

(Evaluation of Heat Resistance in a Thermostatic Oven)

The above resin formed articles were allowed to stand in a thermostatic oven at temperatures of 250° C. for 30 minutes, 300° C. for 30 minutes, or 350° C. for 30 minutes to observe the presence or absence of swelling or shell-cracking on the surface.

(Evaluation of Heat Resistance in Solder)

Tip end portions of the above resin formed articles which length was one centimeter were dipped for 10 seconds in a molten solder at 300° C. After being removed from the solder, the test specimens were observed for presence or absence of surface swelling or shell-cracking.

TABLE 1

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Resol | 45 | 40 | 35 | 39 | 40 | — | 40 | 35 | 50 | 50 |
| Novolak | — | — | — | — | — | 35 | — | — | — | — |
| Hexamethylenetetramine | — | — | — | — | — | 5 | — | — | — | — |
| Glass fiber | 41 | 40 | 40 | 45 | 40 | 40 | 40 | 55 | 30 | 30 |
| Cellulose | — | — | — | — | — | — | 5 | — | — | — |
| Calcium carbonate | — | — | — | — | 10 | — | — | — | 15 | 10 |
| Clay | — | — | — | 5 | — | — | 5 | 5 | — | — |
| Wallastonite | 5 | 10 | 15 | — | — | 10 | — | — | — | — |
| Polyvinyl butyral | 1 | 2 | 2 | 3 | 2 | 2 | — | — | — | 5 |
| Vinyl acetate | — | — | — | — | — | — | 5 | — | — | — |
| Coloring agent | 3 | 3 | 3 | 3 | 3 | 3 | 1 | 1 | 1 | 1 |
| Releasing agent | 2 | 2 | 2 | 2 | 2 | 2 | 1 | 1 | 1 | 1 |
| Curing catalyst | 3 | 3 | 3 | 3 | 3 | 3 | 3 | 3 | 3 | 3 |
| Phenol resin forming material | A | B | C | D | E | F | G | H | I | J |

*The unit used in the table is "part(s) by weight".

TABLE 2

|  | Example | | | | |
| --- | --- | --- | --- | --- | --- |
|  | 1 | 2 | 3 | 4 | 5 |
| Phenol resin forming material | A | B | C | D | E |
| Tensile strength (MPa) | 115 | 110 | 115 | 115 | 120 |
| Tensile modulus of elasticity (GPa) | 13.1 | 12.2 | 14.0 | 12.0 | 13.6 |
| Tensile elongation (%) | 1.1 | 1.0 | 1.0 | 1.1 | 1.2 |
| Coefficient of linear expansion (1/° C. × $10^{-5}$) | 2.8 | 2.5 | 2.3 | 2.5 | 2.4 |
| Heat resistance in thermostatic oven | | | | | |
| 250° C. × 30 min | Good | Good | Good | Good | Good |
| 300° C. × 30 min | Good | Good | Good | Good | Good |
| 350° C. × 30 min | Good | Good | Good | Good | Good |
| Heat resistance in solder | | | | | |
| 300° C. × 10 sec | Good | Good | Good | Good | Good |

*The evaluation criterion in the table was as follows.
Good: No swelling nor cracking occurred.

Examples 2–5 And Comparative Examples 1–5

Phenol resin forming materials B–J were obtained in the same manner as in Example 1 except for changing the composition of the raw materials as shown in Table 1. Formed resin articles {(4 mm in thickness)×(10 mm in width)×(80 mm in length)}, test specimens conforming to the JIS K6911 test, were obtained from the phenol resin forming materials. The tension strength, tension modulus of elasticity, tension elongation, coefficient of linear expansion, and heat resistance in a thermostatic oven and in a solder solution of the test specimens were evaluated. The results are shown in Tables 2 and 3.

TABLE 3

|  | Comparative Example | | | | |
| --- | --- | --- | --- | --- | --- |
|  | 1 | 2 | 3 | 4 | 5 |
| Phenol resin forming material | F | G | H | I | J |
| Tensile strength (MPa) | 120 | 100 | 110 | 80 | 85 |
| Tensile modulus of elasticity (GPa) | 12.8 | 12.4 | 19.0 | 11.5 | 10.9 |
| Tensile elongation (%) | 0.8 | 0.9 | 0.7 | 0.7 | 1.1 |
| Coefficient of linear expansion (1/° C. × $10^{-5}$) | 2.6 | 3.0 | 1.8 | 3.2 | 3.6 |
| Heat resistance in thermostatic oven | | | | | |
| 250° C. × 30 min | B | B | Good | Good | Good |
| 300° C. × 30 min | B,C | B,C | Good | Good | B |
| 350° C. × 30 min | B,C | B,C | Good | Good | B,C |
| Heat resistance in solder | | | | | |
| 300° C. × 10 sec | B, C | B, C | Good | Good | B, C |

*The evaluation criteria of the heat resistance in the table were as follows.
Good: No swelling nor cracking occurred.
B: Swelled
C: Shell cracked

Example 6

The phenol resin forming material A was charged into a mold for forming a pulley heated at 180° C. and compress-molded for 5 minutes at 300 kgf/cm² to obtain a phenol resin pulley shown FIGS. 1 and 2. The main body of the pulley had an external diameter of 120 mm, thickness of 28 mm, V-groove height of 3 mm, V-groove width of 20 mm, and V-groove pitch of 3 mm.

Cold shock and belt slip resistance of the phenol resin pulley were evaluated. The results are shown in Table 4.

The following methods were used for determining various properties.

(Cold Shock)

The phenol resin pulley was subjected to cycles of cold shock resistance test, one cycle consisting of allowing a sample in an atmosphere of –40° C. for 30 minutes, then at 120° C. for 30 minutes, to determine the number of cycles in which cracks were produced in the phenol resin pulley.

(Belt Slip Test)

A metal pulley was arranged on the driving side and a phenol resin pulley was arranged on the driven side. The metal pulley was rotated at 3000 to 4000 rpm, during which water was splashed to the V-groove of the phenol resin pulley to cause the belt to slip. The external appearance of the V-groove of the phenol resin pulley after slipping was observed.

TABLE 4

|  | Example | | | | |
| --- | --- | --- | --- | --- | --- |
|  | 6 | 7 | 8 | 9 | 10 |
| Phenol resin forming material | A | B | C | D | E |
| Cold shock resistance –40° C. to 120° C. (cycle) | 1000< | 1000< | 1000< | 1000< | 1000< |
| Belt slip resistance | Good* | Good* | Good* | Good* | Good* |

*Appearance

Example 7–10 And Comparative Example 6–10

Phenol resin pulleys were prepared in the same manner as in Example 6, except for using the phenol resin forming materials B–J instead of the phenol resin forming material A. Cold shock and belt slip resistance of the phenol resin pulleys were evaluated. The results are shown in Tables 4 and 5.

TABLE 5

|  | Comparative Example | | | | |
| --- | --- | --- | --- | --- | --- |
|  | 6 | 7 | 8 | 9 | 10 |
| Phenol resin forming material | F | G | H | I | J |
| Cold shock resistance –40° C. to 120° C. (cycle) | 100 | 500 | 300 | 200 | 700 |
| Belt slip resistance | B, C | B, C | Appearance Good | Appearance Good | B |

*The evaluation criteria of the belt slip resistance test in the table were as follows.
B: Swelled
C: Shell cracked The following findings are derived from the results shown in Tables 2 and 3. As compared with the phenol resin forming materials of Comparative Examples 4 and 5 containing a larger amount of resin and a smaller amount of glass fiber, the phenol resin forming materials of Examples 1–5 have much higher tensile strength and lower coefficient of linear expansion. As compared with the phenol resin forming material of Comparative Example 3 containing a larger amount of glass fiber, the products of Examples 1–5 have a smaller tensile modulus of elasticity and a larger tensile elongation. The products of Examples 1–5 have larger tensile strength than the product of Comparative Example 2 which contains cellulose. Conclusively, the products of Examples 1–5 have larger mechanical strength, a smaller modulus of elasticity, and a larger elongation.

In addition, the products of Examples 1–5 are free from swelling and shell cracking, whereas swelling and shell cracking occurred in the product of Comparative Example 1 using novolak as a resin component, the product of Comparative Example 2 to which vinyl acetate and cellulose were added, and the products of Comparative Example 5 containing a larger amount of polyvinyl butyral.

Specifically, the products of Examples 1–5 exhibit excellent heat resistance at temperatures of 250° C. and above.

The following findings are derived from the results shown Tables 4 and 5. The phenol resin pulleys of Examples 6–10 exhibited excellent cold shock and belt slip resistance, whereas those of Comparative Examples 6–10 showed poor cold shock resistance and rotation durability and those of Comparative Examples 6, 7, and 10 swelled and produced shell-cracking in the belt slip test. Specifically, the products of Examples 6–10 have been proven to have excellent thermal shock resistance and heat resistance.

INDUSTRIAL APPLICATION

The phenol resin forming material of the present invention can produce a phenol resin pulley for motor vehicles exhibiting high mechanical strength and superior thermal shock resistance and being almost free from swelling or shell cracking at a temperature of 250° C. or above. The phenol resin pulley for motor vehicles of the present invention not only exhibits high mechanical strength and superior thermal shock resistance, but also is almost free from swelling or shell cracking at a temperature of 250° C. or above.

What is claimed is:

1. A phenol resin composition comprising 35 to 45 wt % of resol, 35 to 45 wt % of glass fiber, 5 to 15 wt % of one or mote inorganic powders selected from the group consisting of calcium carbonate, clay, and wallastonite, and 1 to 3 wt % of polyvinyl butyral, wherein the composition does not contain organic fibers.

2. The phenol resin composition according to claim 1, wherein the glass fiber is one or more glass fibers selected from the group consisting of C glass fiber, A glass fiber, E glass fiber, S glass fiber, ARG fiber, and ECR fiber.

3. The phenol resin composition according to claim 1, containing 40 to 45 wt % of glass fiber.

4. The phenol resin composition according to claim 1, wherein the inorganic powder has an average particle diameter 0.1 to 100 $\mu$m.

5. The phenol resin composition according to claim 1, wherein the polyvinyl butyral has a butylation degree of 60 to 95 mol % and a polymerization degree of 200 to 3000.

6. The composition according to claim 1, wherein the glass fiber comprises C glass fiber.

7. The composition according to claim 1, wherein the glass fiber comprises A glass fiber.

8. The composition according to claim 1, wherein the glass fiber comprises E glass fiber.

9. The composition according to claim 1, wherein the glass fiber comprises S glass fiber.

10. The composition according to claim 1, wherein the glass fiber comprises ARG fiber.

11. The composition according to claim 1, wherein the glass fiber comprises ECR fiber.

12. The composition according to claim 1, wherein the inorganic powder is calcium carbonate.

13. The composition according to claim 1, wherein the inorganic powder is clay.

14. The composition according to claim 1, wherein the inorganic powder is wallastonite.

15. The composition according to claim 1, further comprising carbon black.

16. The composition according to claim 1, wherein the glass fiber is E glass fiber having an average fiber diameter of 10 $\mu$m and an average fiber length of 2 $\mu$m.

17. The composition according to claim 1, wherein the inorganic powder is calcium carbonate having an average particle diameter of 3 $\mu$m.

18. The composition according to claim 1, wherein the inorganic powder is sintering clay having an average particle diameter of 3$\mu$.

* * * * *